United States Patent Office 3,332,789
Patented July 25, 1967

3,332,789
COATING COMPOSITION
James N. Abbott, Jr., Gloucester, Mass., assignor to Tarr & Wonson, Ltd., Gloucester, Mass., a corporation of Massachusetts
No Drawing. Filed Apr. 23, 1964, Ser. No. 362,189
7 Claims. (Cl. 106—15)

The present invention relates to a coating composition and more particularly to an antifouling protective coating composition.

Copper compounds, particularly cuprous compounds, have long been known as among the best antifouling ingredients employed as protective coatings designed to prevent marine attachment, growth and accumulation, for instance, on surfaces in underwater environments. The problem of protecting such surfaces, which are constantly exposed to the action of marine fouling organisms such as algae, acorn shells (Balonidae), goose mussels (Lepodoids), barnacles (Conchodermae), tubeworms (Serpulidae), moss (Hydroidae), and particularly in the case of wooden structures, against the ravages of teredos or shipworms, limnoria, martesia, sphaeroma and the like, is a very serious and long existing one.

However, copper compounds containing antifouling compositions to be fully effective require relatively large amounts of the copper compound. Their widespread use is seriously curtailed because of the expense involved in producing these compositions due to the costly nature of the copper compounds. Further, while existing antifouling compositions are relatively effective, i.e. they are toxic to marine growth, it has been found that it is not feasible to prevent their growth over a prolonged period of time.

Therefore, it is an object of the present invention to provide a new and highly effective method of preventing attachment, growth and accumulation of marine organisms on surfaces exposed to underwater environments.

Another object of this invention is to provide antifouling compositions which exert their antifouling properties for a prolonged period of time.

Yet another object of this invention is to provide an antifouling composition wherein the toxic components include copper in substantially reduced amounts while maintaining and exceeding the level of protection heretofore found possible with existing antifouling compositions.

Other objects of the present invention and advantages thereof will become apparent as the description proceeds.

The fundamental concept of the present invention is portrayed by the mixture of an antifouling agent comprising a copper pigment and dichlorodiphenyldichloroethane with a base vehicle to provide an antifouling composition.

The copper pigment employed with the instant invention, preferably, is finely divided copper or cuprous oxide, hydrated or anhydrous. Cupric compounds are also useful antifouling materials. Cuprous oxide is preferred because of its higher toxicity and consequent antifouling effectiveness. When used, the type of cuprous oxide can be any conventionally known such as pyrometallurgical cuprous oxide and electrolytic process cuprous oxide. Moreover, mixtures of finely divided copper and cuprous oxide can also be used. Generally, the copper pigment will comprise about 10 to 40 weight percent of the total antifouling composition, preferably about 16–35 weight percent.

By using dichlorodiphenyldichloroethane in conjunction with the copper pigment, described above, significantly lesser amounts of the latter are necessary to achieve effective and long-lasting antifouling action of the composition. Suprisingly, dichlorodiphenyldichloroethane, of itself, exhibits no antifouling properties when incorporated into a base vehicle and this feature, together with the fact that its use with a copper pigment permits a significant reduction in the necessary amounts of the latter to achieve effective results, provides unexpected advantages of the novel composition employing the antifouling agent of this invention. Generally, dichlorodiphenyldichloroethane is present in amounts of about 10 to 25 weight percent based on the copper pigment employed in the novel antifouling composition. Usually, it is used in amounts of about 2 to 5 weight percent, preferably about 3 to 4 weight percent based on the total composition.

Dichlorodiphenyldichloroethane can be provided by any conventional process such as from the condensation of monochlorobenzene with mixed dichloroacetaldehyde and trichloroacetaldehyde. Generally, the condensation reaction is effected in the presence of a condensing agent such as concentrated sulfuric acid. Generally, the quantity of monochlorobenzene introduced into the reaction is sufficient only to react preferentially with the dichloroacetaldehyde to the substantial exclusion of the chloral-chlorobenzene condensation. It should be understood, however, that any convenient method of preparing dichlorodiphenyldichloroethane can be employed to provide this antifouling component to be used with a copper pigment to provide the novel antifouling agent of this invention.

The base vehicle employed with the novel antifouling agent of this invention preferably is a resinous binding agent such as a cyclic acid. Among the useful cyclic acids are rosin, hydrogenated rosin and abietic acid. Generally, the cyclic acid employed has a molecular weight less than about 500 since cyclic acids of unusually high molecular weight are not practicable because of their excessive dissolution rate in sea water. Other base vehicles can also be employed such as naphthenic acid, phenol-formaldehyde-rosin binder, oleoresinous varnish, tar varnish, pitch varnish and natural and synthetic resin varnish and their emulsions. As the resinous binding agent, there may also be employed chlorinated synthetic rubber, butyl rubber, polyvinyl resins, shellac, phenolic-base varnishes and others.

In addition to the antifouling agent and base vehicle the novel antifouling composition of this invention can also contain a solvent, coloring pigments, filler pigments, plasticizers or other conventional ingredients, the choice of which can be left to the formulator.

For instance, as a solvent there can be used, typically, mineral spirits, conventional paint thinners or xylene. Coloring pigments such as ferric oxide, ultramarine blue, titanium yellow, chrome orange, cadmium red, phthalocyanine green (hexadecachloro copper phthalocyanine), phthalocyanine blue (copper phthalocyanine), zinc chromate, barytes, lithopone, litharge, red lead, whiting, rutile titanium dioxide, bone black, red iron oxide and other conventional coloring pigments can be incorporated into the novel composition to produce the desired color. Extenders such as magnesium silicate and plasticizers such as heat treated menhaden oil can also be incorporated into the novel antifouling compositions of this invention. As is obvious to those skilled in the art, the amount of such ingredients in the total antifouling composition may vary over wide limits, depending on the particular base vehicle chosen and the surface to which the novel antifouling composition is applied. Thus, the novel antifouling agent of this invention is suitably employed for incorporation into compositions to protect, for instance, ship bottoms, or they can effectively be incorporated into construction materials, for instance, plastic materials which are used in the construction of waterfront or in concrete used for underwater construction. The novel antifouling agent may also be added to compositions which are used for impregnating wooden structures for underwater construction.

In order to further illustrate the nature of this invention and the manner of carrying out the same, the following examples are presented:

EXAMPLE 1

|  | G. |
|---|---|
| Copper pigment (cuprous oxide) | 16.4 |
| Dichlorodiphenyldichloroethane | 4.1 |
| Iron oxide | 8.5 |
| Magnesium silicate | 23.2 |
| Gum rosin | 15.9 |
| Heat treated menhaden oil | 6.7 |
| Mineral spirits | 25.2 |
|  | 100.0 |

The gum rosin and dichlorodiphenyldichloroethane were dissolved in the mineral spirits and heat treated menhaden oil to form a liquid mixture. The dry ingredients, i.e. the cuprous oxide, iron oxide and magnesium silicate were charged to a conventional mixing device to which was also added a portion of the liquid mixture. The dry ingredients were thoroughly wetted and dispersed by mechanical shearing action in the liquid mixture after which the remaining liquid mixture was added to the dispersion of dry ingredients and agitated, as by stirring, until a homogeneous antifouling composition was produced.

EXAMPLE 2

|  | G. |
|---|---|
| Copper pigment (finely divided elemental copper) | 35.2 |
| Dichlorodiphenyldichloroethane | 3.5 |
| Iron oxide | 4.2 |
| Magnesium silicate | 13.7 |
| Gum rosin | 16.5 |
| Heat treated menhaden oil | 3.7 |
| Mineral spirits | 23.2 |
|  | 100.0 |

These components were admixed in a manner similar to that described above in Example 1.

While this invention has been described with reference to certain specific embodiments and illustrated by way of specific examples, these are illustrative only and the invention is not to be construed as limited except as set forth in the following claims:

What is claimed is:
1. An antifouling marine coating composition consisting essentially of an organic resinous base vehicle and an antifouling agent comprising a copper pigment selected from the group consisting of finely divided elemental copper and cuprous oxide and dichlorodiphenyldichloroethane, said copper pigment being present in amounts of 10–40 weight percent and said dichlorodiphenyldichloroethane being present in amounts of 2–5 weight percent based on the total composition.

2. The antifouling marine coating composition of claim 1 wherein said copper pigment is present in amounts of 10–40 weight percent of said composition and said dichlorodiphenyldichloroethane is present in amounts of 10–25 weight percent of said copper pigment.

3. The antifouling marine coating composition of claim 1 including a color pigment, a plasticizer and a diluent and in which said copper pigment is present in amounts of about 16 to 35 weight percent of said composition and said dichlorodiphenyldichloroethane is present in amounts of 3–4 weight percent of said composition.

4. An antifouling pigment composition comprising a copper pigment selected from the group consisting of finely divided elemental copper and cuprous oxide and dichlorodiphenyldichloroethane.

5. The antifouling pigment composition of claim 4 wherein said dichlorodiphenyldichloroethane is present in amounts of about 10 to 25 weight percent of said copper pigment.

6. A method of preventing marine growth on an underwater surface which comprises applying to said surface an antifouling composition comprising a resinous base vehicle having intimately and uniformly distributed therein in an amount between 10 and 40 weight percent a copper pigment selected from the group consisting of finely divided elemental copper and cuprous oxide and between 2 and 5 weight percent dichlorodiphenyldichloroethane.

7. The method of claim 6 wherein said resinous base vehicle is rosin.

References Cited

UNITED STATES PATENTS

| 2,579,610 | 12/1951 | Pitre et al. | 106—154 XR |
| 3,100,718 | 8/1963 | Dunn et al. | 106—15 |

FOREIGN PATENTS

| 852,882 | 11/1960 | Great Britain. |

OTHER REFERENCES

The Condensed Chemical Dictionary, 6th ed., Reinhold Pub. Corp., N.Y. (Page 1109 "TDE".)

ALEXANDER H. BRODMERKEL, *Primary Examiner.*

J. B. EVANS, *Assistant Examiner.*